United States Patent
Brown et al.

[15] 3,691,197
[45] Sept. 12, 1972

[54] PREPARATION OF 1-SUBSTITUTED-3-CHLOROPYRROLIDINES

[72] Inventors: Bernard Beau Brown, 146 Tudor Oval, Westfield, N.J. 07090; John Swidinsky, 1034 S. Orange Ave., Newark, N.J. 07106

[22] Filed: Dec. 17, 1970

[21] Appl. No.: 99,252

Related U.S. Application Data

[63] Continuation-in-part of Ser. No. 746,284, July 22, 1968, abandoned.

[52] U.S. Cl..........260/326.8, 260/570.8 R, 260/578, 260/583 G, 260/999
[51] Int. Cl..............................................C07d 27/04
[58] Field of Search....................................260/326.8

[56] References Cited

UNITED STATES PATENTS 3,318,908   5/1967   Swidinsky et al.....260/326.62

*Primary Examiner*—Alex Mazel
*Assistant Examiner*—Joseph A. Narcavage
*Attorney*—Frank E. Robbins, Joseph Shekleton, Janet E. Price, Robert D. Weist, Martha A. Michaels and Dorothy R. Thumler

[57] ABSTRACT

A method for preparing a 1-hydrocarbyl-3-chloropyrrolidine, particularly, a method of preparing said pyrrolidine by rearrangement of an N-chloro-1-hydrocarbyl-amino-2-chlorobutane to a 1-hydrocarbyl-amino-2,4-dichlorobutane, which then is cyclized. This rearrangement is carried out by treatment of the 2-chlorobutane by treatment with a strongly ionized acid and a free radical generating catalyst. The intermediate dichlorobutane then is cyclized to the chloropyrrolidine by means of treatment with a base. The invention is also concerned with novel compositions including 1-hydrocarbyl-amino-2-chlorobutanes, N-chloro-1-hydrocarbyl-amino-2-chlorobutanes and 1-hydrocarbyl-amino-2,4-dichlorobutanes.

14 Claims, No Drawings

PREPARATION OF 1-SUBSTITUTED-3-CHLOROPYRROLIDINES

This application is a continuation-in-part of application Ser. No. 746,284, filed July 22, 1968, now abandoned.

A number of drugs are known which inhibit the actions of acetylcholine on structures enervated by postganglionic cholinergic nerves and on smooth muscles that respond to acetylcholine but lack cholinergic enervation. These agents are generically known as antimuscarinic agents and demonstrate a competitive or surmountable antagonism to acetylcholine and other muscarinic agents. In essence, these drugs can inhibit muscarinic actions of acetylcholine and other choline esters. Such drugs have also been variously termed by a number of other names such as anticholinergic drugs.

One particular drug of this class is known as glycopyrrolate sold under the trade name "Robinul". This drug has the following structure:

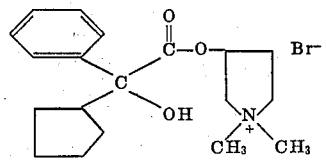

The above drug is a potent anticholinergic drug type used for the treatment of the gastro-intestinal tract and is particularly useful in the treatment of peptic ulcers. While it is not entirely understood exactly how this drug works it is assumed that it behaves along the line of the acid-peptic theory, and it is strongly felt that proper therapy is achieved through an antacid effect. The just mentioned drug is particularly effective at extremely low concentrations, and therefore does not induce undesirable side effects such as dizziness, restlessness, irritability, disorientation, depression, and other undesirable side effects, generally due to a blocking of responses to parasympathetic activity at all effector organs. Most drugs of this type produce the undesirable side effects of generalized parasympathetic block.

A very important intermediate used to prepare glycopyrrolates is a 1-hydrocarbyl-3-chloropyrrolidine. The commercial glycopyrrolate can be prepared by reaction of 1-methyl-3-chloropyrrolidine with the sodium salt of alpha-phenylcyclopentaneglycolic acid. The resultant compound is then quaternized with methyl bromide to produce the commercial anti-cholinergic compound shown above.

Up to now the 1-hydrocarbyl-3-chloropyrrolidines have been prepared by the chlorination of a 1-hydrocarbyl-3-pyrrolidinol by reaction with such reagents as thionyl chloride. The 1-hydrocarbyl-3-pyrrolidinols are prepared only through an extremely complicated sequence of steps. The multi-step synthesis involves a great number of individual and difficult steps, leading to an overall poor yield of the desired 1-hydrocarbyl-3-chloropyrrolidine.

It would be a considerable advance in the art if a new and simplified method of achieving a 1-hydrocarbyl-3-chloropyrrolidine were found. If the pyrrolidine could be made in a minimum number of steps, and particularly could be achieved in relatively high yields without isolating intermediates, such process would be a distinct advance in the art.

It therefore becomes an object of the invention to provide a method of preparing a 1-hydrocarbyl-3-chloropyrrolidine.

A specific object of the invention is to prepare the above pyrrolidine in a simplified procedure which does not involve exotic reagents or sophisticated tailor-made equipment.

Another object of the invention is to provide a method of preparing a 1-hydrocarbyl-3-chloropyrrolidine in relatively high yields through an intermediate which need not be isolated.

Yet another object of the invention is to provide a method of making a 1-hydrocarbyl-3-chloropyrrolidine from a starting material which is easily prepared by known techniques.

A still further object of the invention is to provide novel intermediate compounds produced in making a 1-hydrocarbyl-3-chloropyrrolidine.

Other objects will appear hereinafter.

BROAD DESCRIPTION OF THE INVENTION

In accordance with the invention a new procedure for making a 1-hydrocarbyl-3-chloropyrrolidine has been discovered. In its broadest aspects the process involves effecting a chloro rearrangement of an N-chloro-1-hydrocarbyl-amino-2-chlorobutane to a 1-hydrocarbyl-amino-2,4-dichlorobutane. This is carried out by treatment of the first named compound with a strongly ionized acid and a free radical generating catalyst. The 1-hydrocarbyl-amino-2,4-dichlorobutane is then cyclized by treatment of said dichlorobutane with a base to produce the sought-after pyrrolidine compound. The pyrrolidine compound is then further reacted as outlined above to produce the desired glycopyrrolate. A number of intermediates leading up to the desired product are believed to be novel also.

DETAILED DESCRIPTION OF THE INVENTION

The first step in the reaction sequence set out here involves a chloro rearrangement of an N-chloro-1-hydrocarbyl-amino-2-chlorobutane. This compound can be obtained via a number of techniques which will be described in further detail hereinafter. This rearrangement is broadly effected by treatment of the above compound with a strongly ionized acid and a catalyst which has the capability of generating free radicals. The treatment with acid catalyst may be effected by a wide variety of techniques to effect the rearrangement. Perhaps the best procedure is to add the N-chloro-1-hydrocarbyl-amino-2-chlorobutane to a cold solution of strong acid. In the typical situation the chlorobutane is added over a period of time ranging from about 10 to about 60 minutes while holding the strong acid at 0°–15° C. The acid in effect acts both as a solvent and aids in carrying out the rearrangement.

In still another embodiment of the invention a solution of the chlorobutane may be added to the cold sulfuric acid. The solvent employed, of course, must not be effected by the strongly ionized acid. One excellent solvent that may be utilized here is chloroform. After treatment with acid the lower acid layer is separated from the organic solvent layer. The upper organic layer may then be extracted a number of times with further portions of acid to get increased yields of the wanted product.

The acid that is employed here is a strongly ionized acid or one known as a "super acid". These acids are well-known in the art and need little elaboration. They have a pK at 25° C. of less than 4.0. Typical among these are concentrated sulfuric acids such as 85 percent sulfuric acid, concentrated phosphoric acid as 85 percent phosphoric acid and trihaloacetic acids such as trifluoroacetic acid. Other strongly ionized acids may also be used.

Again, treatment with the appropriate catalyst may be effected in a number of varying ways. For example, the catalyst may be added to the acid, to which combination is then added the chlorobutane. However, it has been determined that the best mode of treatment involves first contact of the chlorobutane with the strong acid as elaborated above, followed by addition thereto of the catalyst. After addition of catalyst it is preferred that the mixture then be heated. The heat treatment may vary widely with respect to time and temperature variables. In a typical situation the mixture is heated for 1/⅔ hours at a temperature ranging from about 70° to about 120°C.

The free radical generating catalyst may be an aliphatic or aromatic diazo compound, an organic or inorganic peroxy compound, or a redox system.

The diazo compound preferably is one having fewer than 20 carbons. Illustrative aliphatic diazo compounds include bisazoisobutyronitrile, bisazoisobutane, biazoisoctane, bisazo2-caprylicnitrile and diazomethane. Bisazoisobutyronitrile is a preferred catalyst. Illustrative aromatic diazo compounds include 4,4'dimethoxydiazoaminobenzene, p-methoxyphenyl-diazothio-2naphthyl ether and diazoaminobenzene.

The organic peroxy compound may be any of the following:

R—O—O—R' or R—O—O—H where R and R' are alkyl, aryl, alkaryl, aralkyl or acyl having fewer than 20 carbons. Illustrative species include diethyl peroxide, dibutyl peroxide, diacetyl peroxide, dibutyryl peroxide, benzoyl peroxide, bisphenylacetyl peroxide, α-cumyl hydroperoxide, peracetic acid, perbenzoic acid and perdecanoic acid.

The inorganic peroxy compounds may be hydrogen peroxide, the metal peroxides, perborates, percarbonates, perchlorates and persulfates. Preferred metals are sodium, potassium and lithium. For the purposes herein ammonium also is regarded as a metal. Thus, ammonium persulfate is an effective catalyst. A particularly preferred catalyst is potassium persulfate.

The redox systems contemplated herein are combinations of any of the above peroxy compounds with a reducing agent. The reducing agent usually is the ferrous ion, although it may also be a reducing sugar such as glucose or fructose, or a polyamine such as ethylene or propylene polyamines, e.g., diethylene triamine, tetraethylene pentamine, pentapropylene hexamine and propylene diamine. The polyamines herein are alkylene polyamines having up to six alkylene groups where the alkylene groups may each contain up to four carbons.

A particularly preferred catalyst system is a redox catalyst system such as the combination of ferrous ammonium sulfate and potassium persulfate.

The above reaction may be better depicted through the following equation:

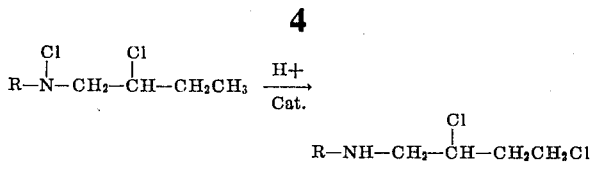

In the above formula the R group or 1-substitutent on the nitrogen atom may be rather widely varied. Preferred R groups are alkyl groups having from one to 12 carbons, phenylalkyl groups having from seven to 10 carbons and cycloalkyl groups having from four to eight carbons. Among these may be specified methyl, ethyl, butyl, isopropyl, benzyl, cyclopentyl, cyclohexyl, 4-methylcyclohexyl, cyclobutyl, etc. Preferred 1-substituent groups attached to the nitrogen atom include methyl, benzyl, and cyclohexyl. Of course, if one wishes to make the glycopyrrolate known as "Robinul" the substituent on the nitrogen is methyl.

The second step in the reaction sequence involves treatment of the dichlorobutane with base to effect ring closure. This in effect leaves a pyrrolidine structure having a chloro group in the three position and a R group as defined above attached to the ring nitrogen. The 1-hydrocarbyl-3-chloropyrrolidine can then be used as an intermediate in making a wide variety of compounds as well as in making glycopyrrolate.

The ring closure reaction is as follows:

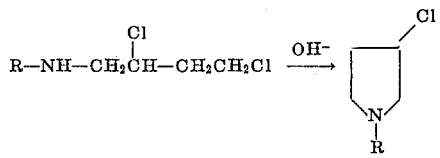

The ring closure reaction is best carried out by treating the acid solvent containing the dichlorobutane with a base. Any strong base, including particularly alkali and alkaline earth metal hydroxides, may be utilized here, and usually cooling is required during the addition of the base due to the exothermic reaction involved. Thus, such basic reagents as sodium hydroxide, potassium hydroxide, lithium hydroxide, sodium carbonate, calcium hydroxide and barium hydroxide may be utilized. Due to ready availability and low cost, sodium hydroxide is preferred. As a typical example a solution containing 20–50 percent by weight of sodium hydroxide may be added to the sulfuric acid solution. During the addition it is preferred that the temperature be kept below about 70°C. and more often below about 60°C.

After addition of base the mixture may be warmed, if desired, and the product then isolated. The best means of isolating the pyrrolidine is by extraction with an appropriate organic material. In a typical run, the pyrrolidine is extracted with a number of portions of ethyl ether. The ether extracts are then dried over sodium sulfate, the ether separated from the pyrrolidine by distillation under vacuum, and the sought-after product thus isolated.

In the above sequence of steps it is a preferred practice that the 1-hydrocarbyl-amino-2,4-dichlorobutane not be isolated, though if desired it could be otherwise.

There are a number of different ways to obtain the N-chloro-1-hydrocarbyl-amino-2-chlorobutane reactant as shown above. Perhaps the best method is carried out by reacting a 1-hydrocarbyl-amino-2-chlorobutane with a source of hypohalite or halite. Preferred reagents here are sodium hypochlorite, sodium chlorite, sodium hypobromite, sodium bromite, and like reagents. Sodium hypochlorite is particularly preferred. This reaction is shown as follows:

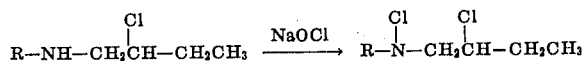

This particular step may be carried out a number of ways. For example, an aqueous solution of the 1-hydrocarbyl-amino-2-chlorobutane or salt thereof may be prepared which is then added to the hypohalite or halite. As a specific example a solution of 2-chlorobutane may be added to a solution of sodium hypochlorite. In one experiment to equal amounts of an aqueous solution of sodium hypochlorite and chloroform was added the aqueous solution of the amino-chlorobutane. The chloroform or organic layer contains the desired product of N-chloro-1-hydrocarbyl-amino-2-chlorobutane. The aqueous layer may be then extracted with additional portions of organic extractants such as chloroform to obtain as much yield of product as is possible.

In following this sequence of events, that is, starting with a 1-hydrocarbyl-amino-2-chlorobutane to achieve the 1-hydrocarbyl-3-chloropyrrolidine, neither of the two intermediates, that is, the N-chloro-1-hydrocarbyl-amino-2-chlorobutane and the 1-hydrocarbyl-amino-2,4-dichlorobutane need be isolated, and the overall reaction sequence proceeds satisfactorily without doing so. Such is a distinct advantage with respect to the overall method of the invention, making the above sequence of steps more attractive from practical and commercial standpoints.

Again, the 1-hydrocarbyl-amino-2-chlorobutane reagent may be prepared via a number of known reported techniques. For example, a 1-hydrocarbyl-amino-2-butanol may be reacted with thionyl chloride, thereby replacing the hydroxy group with a chloro group. With more specificity, the amino butanol may be dissolved in a solvent such as benzene to which is added a slight excess of thionyl chloride. The reaction is then caused to occur by refluxing the benzene for a number of hours, such as 2-3 hours. The hydrochloride of the 1-hydrocarbyl-amino-2-chloro-butane is then obtained which is filtered from the reaction mass and washed with various solvents such as benzene and acetone. This reaction proceeds as follows:

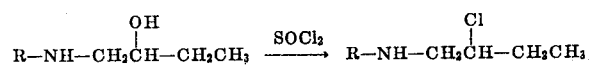

Lastly, the 1-hydrocarbyl-amino-2-butanol may be prepared by reaction of a primary amine with butylene oxide via a well-known type of reaction. Thus, for example, an aqueous solution of a monoalkylamine such as methylamine, may be prepared. To this is then added 1,2-epoxybutane, with the amine being employed in a molar excess such as in a 5:1 ratio.

Equal molar amounts of amine and epoxy compound may also be reacted whereupon the reactants are heated to reflux for a period of say 3–6 hours. The mixture can then be fractionally distilled to obtain the substituted butanol compound. In still another type of reaction an excess of aniline may be caused to react with the epoxy butane. Again, the reaction mixture may be heated to reflux for a number of hours, say around 6 hours. Excess aniline is then vacuum distilled from the reaction mass and the residue containing the desired butanol compound recrystallized from hexane.

While a number of reactions have been discussed above, essence of the invention lies in the discovery that through use of a particular acid and catalyst a specific chloro rearrangement may be effected as demonstrated above. The second phase of the essential part of the invention lies in treating the thus chloro rearranged derivative with base to effect the appropriate ring closure.

The following examples illustrate typical ways of carrying out the method of the invention. It is understood, of course, that these examples are merely illustrative, and that the invention is not to be limited thereto. All parts and percentages are by weight unless otherwise expressed.

EXAMPLE I

PREPARATION OF 1-METHYL-3-CHLOROPYRROLIDINE

A solution of 15.8 g. (0.1 mole) of 1-methylamino-2-butyl chloride hydrochloride in 60 ml. of water was added to a stirring ice cold mixture of 150 ml. of a 1 N sodium hypochlorite solution and 150 ml. of chloroform over a 20 minute period. The temperature during addition was kept below 10°C. The chloroform layer was then separated from the aqueous layer, and the aqueous layer extracted twice with 15 ml. portions of chloroform. The combined chloroform solution of N-chloro-1-methylamino-2-chloro-butane was chilled in an ice bath and added with stirring to 60 ml. of ice cold 85 percent sulfuric acid over a 20–30 minute period at 5°–10°C. The lower sulfuric acid layer was then separated from the chloroform layer, and the chloroform layer was then extracted twice with 20 ml. portions of 85 percent sulfuric acid. To the combined 85% sulfuric acid solution was added 0.4 g. of ferrous ammonium sulfate and 0.2 g. of potassium persulfate. The catalyst-treated mixture was heated to 105°–110 °C. until a drop of the mixture added to about 2–3 ml. of a 1–2 percent potassium iodide solution no longer liberated free iodine (development of a yellow to red color). This required approximately 1.5 hours. The solution was then cooled and added to a cold solution of 200 g. of sodium hydroxide in 500 ml. of water at such a rate that the temperature did not exceed 60°C. The mixture was then warmed to 60°C. for 10 minutes, cooled and extracted with six 50 ml. portions of ethyl ether. The ether extracts were dried over sodium sulfate, and then the ether was distilled off on a hot water bath. The residual from the ether distillation was then vacuum-distilled to give 4.4 g. (37 percent) of 1-methyl-3-chloropyrrolidine. The pyrrolidine had a b.p.

of 80°C. at 120 mm. pressure. Its I.R. spectrum was compared with a known sample of 1-methyl-3-chloropyrrolidine prepared by reaction of thionyl chloride with 1-methyl-3-pyrrolidinol. The I.R. spectrum of the sample prepared in this experiment was identical with that prepared according to the prior art technique.

EXAMPLE II

PREPARATION OF 1-BENZYL-3-CHLOROPYRROLIDINE

A solution of 23.4 g. (0.1 mole) of 1-benzylamino-2-butylchloride hydrochloride in 100 ml. of water was added with stirring to a mixture of 150 ml. chloroform and 150 ml. of 1 N sodium hypochlorite solution over a 20 minute period at 5°–10°C. The chloroform layer was separated and the aqueous layer extracted twice with 25 ml. portions of chloroform. The combined chloroform solution was chilled in an ice bath and added with stirring to 60 ml. of cold 85 percent sulfuric acid over a 30 minute period at 5°–10°C. The lower layer of sulfuric acid solution was separated from the chloroform layer. The chloroform layer was extracted twice with 60 ml. portions of 85 percent sulfuric acid. To the combined 85 percent sulfuric acid solution of N-chloro-1-benzylamino-2-chlorobutane was added 0.3 g. of ferrous ammonium sulfate and 0.3 g. of potassium persulfate. The mixture was heated to 55°– 60°C. for 1.5 hours, cooled and added to a stirring solution of 300 g. of sodium hydroxide contained in 700 ml. of water at such a rate that the internal temperature did not exceed 60°C. The mixture was kept at 60°C. for 10–15 minutes and cooled. The product was extracted with five 100 ml. portions of ethyl ether. Distillation of the ethereal extracts yielded 6.2 g. (32.2%) of 1-benzyl-3-chloropyrrolidine, b.p. of 92°–96°C./1 mm. The I.R. spectrum was the same as that of an authentic sample (prepared from 1-benzyl-3-pyrrolidinol and thionyl chloride).

EXAMPLE III

PREPARATION OF 1-CYCLOHEXYL-3-CHLOROPYRROLIDINE

A solution of 23.4 g. (0.1 mole) of 1-cyclohexylamino-2-butyl chloride hydrochloride was added with stirring to a cold mixture of 150 ml. 1 N sodium hypochlorite and 150 ml. of chloroform over a 20 minute period at 5°–10°C. The chloroform layer was separated and the aqueous layer extracted twice with 25 ml. portions of chloroform. The cold combined chloroform solution was added with stirring to 60 ml. of cold 85 percent sulfuric acid over a 30 minute period at 5°–10C. The 85 percent sulfuric acid solution was separated from the chloroform which was extracted twice with 30 ml. portions of 85 percent sulfuric acid. To the combined 85 percent sulfuric acid solution of N-chloro-1-cyclohexyl-amino-2-chlorobutane was added 0.3 g. of ferrous ammonium sulfate and 0.3 g. of potassium persulfate. An exothermic reaction occurred at this point and the temperature rose to 40°C. It was maintained at this point for 1.5 hours, after which time little unreacted material was left. By heating up to 80°C. all traces of active chloride-containing substance were removed. The 85 percent sulfuric acid solution was then chilled, and added with stirring to a cold solution of 250 g. of sodium hydroxide contained in 600 ml. of water at such a rate that the temperature did not exceed 60°C. Then the mixture was kept at 60°C. for 15 minutes, cooled and extracted 5 times with 75 ml. portions of ethyl ether. Distillation of the ethereal extracts yielded 13.6 g. (72.5 percent yield) of 1-cyclohexylamino-3-chloropyrrolidine, b.p. of 72°–75°C./1 mm.

IMPORTANCE OF CATALYST

This example illustrates the importance of utilization of catalyst in order to obtain reasonably satisfactory yields.

EXAMPLE IV

Essentially the directions of Example I was followed with the exception that the ferrous ammonium sulfate and potassium persulfate redox catalyst combination was not employed. The 85 percent sulfuric acid solution of N-chloro-1-methyl-amino-2-chlorobutane had to be heated for 4 hours instead of the 1.5 hours heating step in Example I in order for the reaction to be completed (evidenced by no liberation of iodine in the potassium iodide solution). After processing in an identical manner, only 2.4 g. (20 percent yield) of 1-methyl-3-chloropyrrolidine was obtained.

It is thought that a number of intermediates employed to gain the desired 1-hydrocarbyl-3-chloropyrrolidine are new. These include the 1-hydrocarbylamino-2-chlorobutanes, N-chloro-1-hydrocarbylamino-2-chlorobutanes and 1-hydrocarbyl-amino-2,4-dichlorobutanes, where the 1-hydrocarbyl or R group is as before defined.

The above products of the invention found as intermediates in the herewith disclosed process may be utilized for a wide variety of purposes. Of course, these products are intermediates toward preparation of the sought-after glycopyrrolate when R is methyl. Similar derivatives of this type may be used for preparation of drugs exhibiting a variety of therapeutic effects. Moreover, the claimed compounds may be used as intermediates in forming a wide variety of organic substances useful in numerous industrial applications. For example, from these compounds may be made corrosion inhibitors, antifoams, polymeric substances of diverse types useful as coagulants, as paper additives, etc., vulcanization accelerators, herbicides, pesticides, scale inhibitors in evaporators, feed water heaters, economizers, boilers and other parts of steam generating systems, microbiocides, antifoulant chemicals, surfactants, coating agents, chemical adjuvants used in treatment of textiles for various purposes, etc. The compounds discovered here may be used not only to prepare derivatives for the just-mentioned uses and others, but in many instances may be directly used for these purposes without further chemical modification or formulation.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within know or customary practice in the art to which the invention pertains and as may be applied to the essential features hereinbefore set forth, and as fall within the scope of the invention.

What is claimed is:

1. A method for preparing 1-hydrocarbyl-3-chloropyrrolidines which comprises the steps of effecting rearrangement of an N-chloro-1-hydrocarbyl-amino-2-chlorobutane to a 1-hydrocarbyl-amino-2,4-dichlorobutane by treatment with a strongly ionized acid having a pK less than 4 and a free radical generating catalyst, followed by treatment of said dichlorobutane with an alkali or alkaline earth metal base, said hydrocarbyl group being an alkyl group having from one to 12 carbons, a phenylalkyl group having from seven to 10 carbons or a cycloalkyl group having from four to eight carbons.

2. The method of claim 1 wherein the hydrocarbyl group is an alkyl group.

3. The method of claim 2 wherein the strongly ionized acid is concentrated sulfuric, concentrated phosphoric, or a trihaloacetic acid.

4. The method of claim 3 wherein the strongly ionized acid is concentrated sulfuric.

5. The method of claim 3 wherein the strongly ionized acid is concentrated phosphoric acid.

6. The method of claim 2 wherein the hydrocarbyl group is methyl.

7. The method of claim 2 wherein the hydrocarbyl group is benzyl.

8. The method of claim 2 wherein the hydrocarbyl group is cyclohexyl.

9. The method of claim 1 wherein the base is sodium hydroxide.

10. The method of claim 2 wherein the base is sodium hydroxide.

11. The method of claim 3 wherein the base is sodium hydroxide.

12. The method of claim 1 wherein said catalyst is a redox catalyst.

13. The method of claim 1 wherein said catalyst is hydrogen peroxide.

14. The method of claim 11 wherein said redox catalyst comprises ferrous ammonium sulfate and potassium persulfate.

* * * * *